United States Patent Office 3,163,993
Patented Jan. 5, 1965

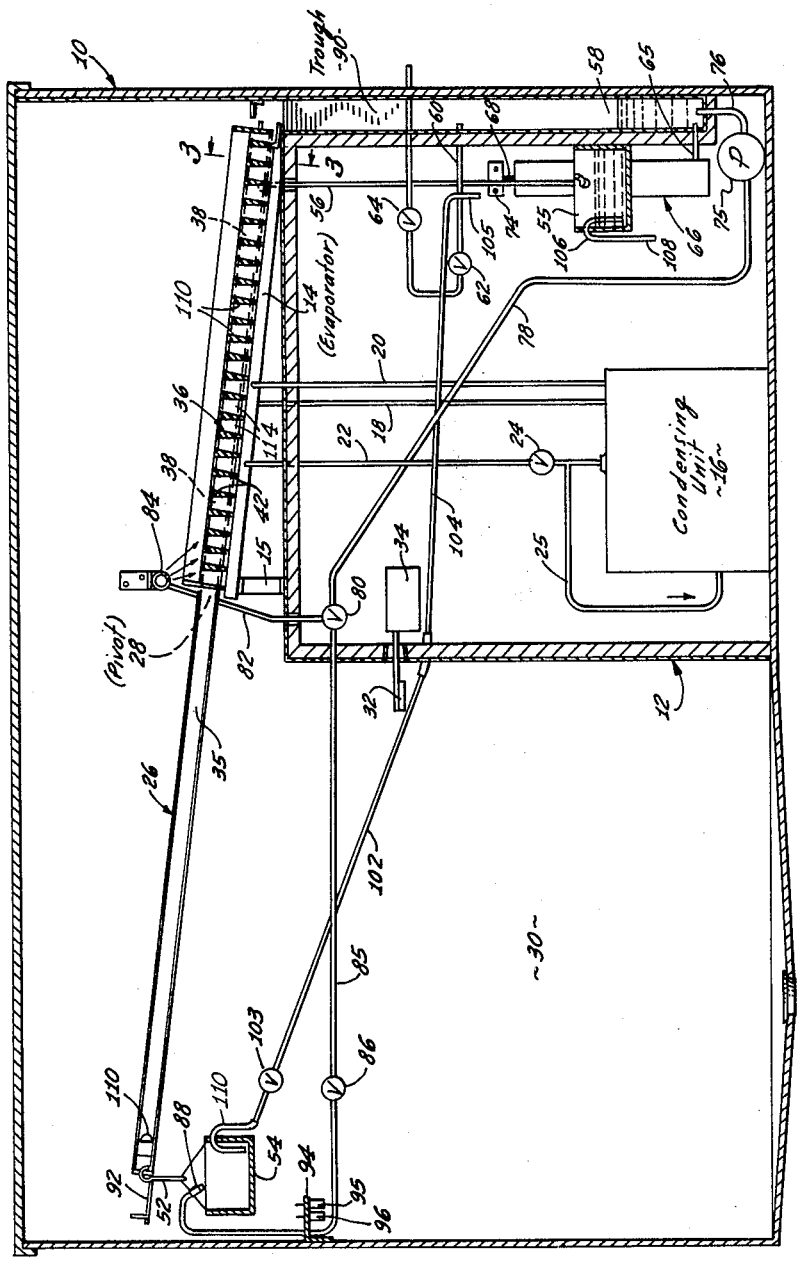

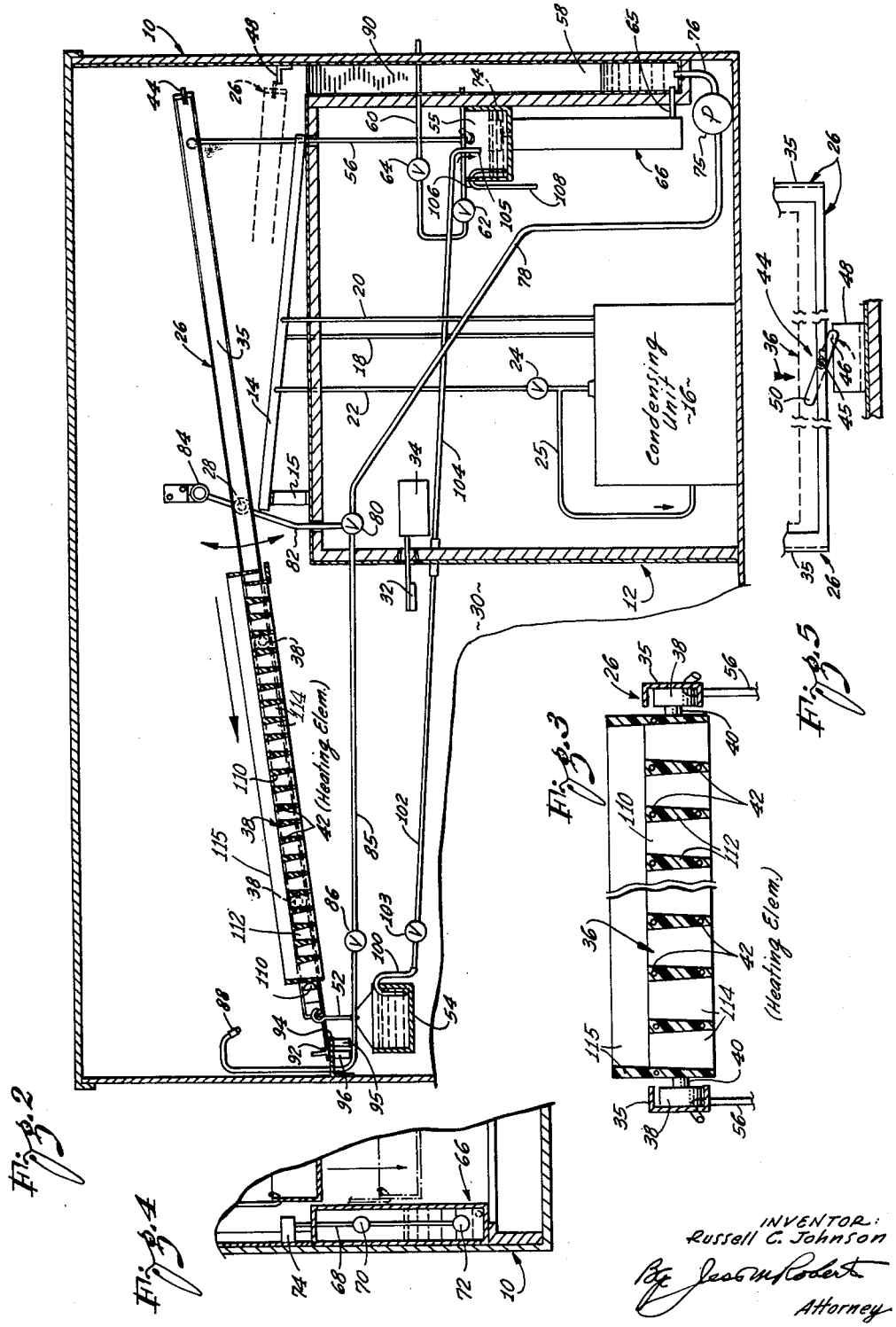

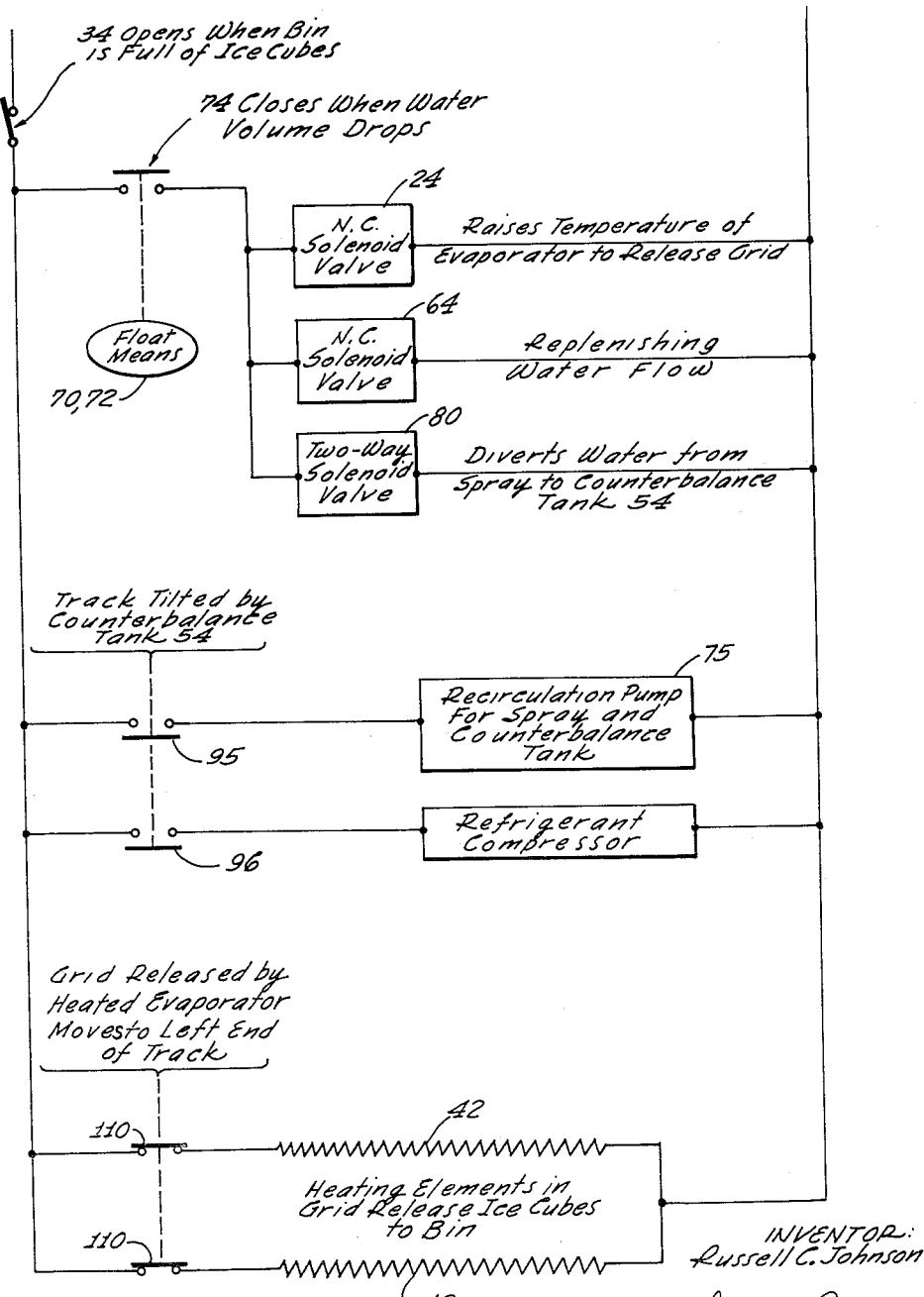

3,163,993
MACHINE FOR MAKING ICE CUBES
Russell C. Johnson, Pomona, Calif.
(3436 Bonanza St., Springfield, Mo.)
Filed Aug. 19, 1963, Ser. No. 303,017
13 Claims. (Cl. 62—138)

This invention relates to an apparatus for making ice cubes in an automatic cyclic manner.

Many different types of apparatus have been developed for this purpose but, in general, such apparatus are of complicated construction incorporating costly components, notably expensive thermostats, to control different stages in the automatic cycle.

An important object of the present invention is to simplify the construction of such an apparatus and to provide an automatic cyclic system that is made up of inexpensive components.

Generally described, the object of the invention is attained by cycling water not only for the usual purpose of freezing ice cubes but also for the additional purpose of timing the automatic operations of freezing and harvesting the ice cubes and for the additional purpose of conveying the ice cubes from the freezing zone to a harvesting zone. An important feature of the invention in this regard is the use of water for timing the successive steps of the cycle and the actuation of all of the mechanical parts by the action of the same water. Thus electric power is used for refrigeration, for pumping the water used to carry out the water cycle and for operating valves at different stages of the cycle but no electric motor means is required to convey the ice cubes to the harvesting zone or to carry out the harvesting operation.

In the presently preferred practice of the invention disclosed herein, the mode of operation is based on two interrelated concepts. One concept is to interrupt the freezing operation in response to a water replenishing operation with the replenishing operation prolonged sufficiently to afford time for the harvesting operation to be completed. The other concept is to automatically fill and drain counterbalancing water tanks to cause a grid for forming the ice cubes to move by gravity from a freezing zone to a harvesting zone for release of the ice cubes at the harvesting zone and to return by gravity to the freezing zone within the time period afforded by the water replenishing operation. With these two concepts in mind it is a simple matter to regulate the water replenishing operation to control the time duration of the overall cycle and to regulate the rate of flow of the counterbalancing water to provide whatever time interval is required in the overall cycle for the release of the ice cubes at the harvesting station.

The various objects and features of the invention may be understood from the following detailed description together with the accompanying drawings.

In the drawings, which are to be regarded as merely illustrative:

FIG. 1 is a simplified side elevational view, partly in section, of the presently preferred embodiment of the invention, with the parts positioned for the operation of freezing the ice cubes;

FIG. 2 is a similar view with the parts positioned for the harvesting of the finished ice cubes;

FIG. 3 is a fragmentary transverse sectional view of the grid for forming the ice cubes;

FIG. 4 is an elevational view, partly in section, showing a portion of the water supply tank and the float control associated therewith;

FIG. 5 is a fragmentary plan view of a latch that is released by the return of the grid to the freezing zone; and FIG. 6 is a wiring diagram of the electrical components of the apparatus.

Referring to FIG. 1, the working parts of the apparatus are enclosed in a cabinet 10 and the working parts are, for the most part, supported by an inner box-like housing 12 of insulated construction. Mounted on the top of the inner housing 12 is an evaporator 14 with a large rectangular upper surface, the evaporator being inclined at an angle with one end of the evaporator elevated by a bracket 15.

The refrigeration system comprises the evaporator 14 and the usual condensing unit 16 which includes the usual compressor (not shown). The condensing unit 16 is connected to the evaporator 14 by the usual liquid line 18 and suction line 20. In addition a line 22 extends from the condensing unit to the evaporator for delivering hot discharge gas to the evaporator when defrosting of the evaporator is required to release the grid. The line 22 is controlled by a normally closed solenoid valve 24 and when the solenoid valve is closed the hot gas is discharged into the condenser through branch pipe 25.

An open rectangular frame, generally designated 26, is mounted above the evaporator 14 to tilt about a pivot axis 28 between a position shown in FIG. 1 for forming ice cubes at the evaporator 14 and the alternate position shown in FIG. 2 for release of the finished ice cubes into a bin 30. A thermostat 32 at an elevated point in the bin 30 controls a master switch 34 and when the finished ice cubes accumulate sufficiently to engulf the thermostat, the thermostat operates the master switch to stop the entire operation. The thermostat 32 is insulated to cause a delay action which will allow the harvest cycle to be completed and return the grid to the ice making position.

The rectangular frame 26 may be termed a track frame because, as shown in FIG. 3, the two longitudinal side members 35 of the frame are channel members to serve as tracks for a rectangular grid 36 in which the ice cubes are formed. As indicated in FIGS. 1 and 3, the rectangular grid 36 is supported by four rollers 38 on corresponding trunnions 40, which rollers travel along the two channel-shaped track members 35. The rectangular grid 36 may be made of suitable plastic material in which heating elements 42 are embedded to heat the grid for the purpose of releasing the finished ice cubes.

In FIG. 1 where the track frame is inclined downward to the right with the grid 36 resting on the evaporator 14, the weight of the grid without the added weight of ice cubes is sufficient to keep the track frame at the position shown. On the other hand, in FIG. 2 where the track frame is inclined in the opposite direction with the grid 36 at the harvesting zone, the weight of the grid without the added weight of ice cubes is again sufficient to keep the track frame at the position shown. It is apparent that if a force is applied to tilt the track frame 26 from the position shown in FIG. 1 to the position shown in FIG. 2, the grid 36 will gravitate from the freezing zone to the harvesting zone and if a force is subsequently applied to tilt the track frame back to the position shown in FIG. 1, the grid will gravitate on the rollers 38 from the harvesting zone to the freezing zone.

Although the grid 36 should be in contact with the evaporator 14 when the grid is at the freezing zone as shown in FIG. 1, it is not desirable for the grid to make frictional contact with the evaporator during the travel of the grid from the harvesting zone to the freezing zone. Consequently it is desirable to provide an automatic latch to keep the right end of the track frame slightly elevated until the grid gravitates to the freezing zone.

For this purpose FIG. 5 shows a lever 44 mounted by a pivot 45 on the end of the track frame 26 with the lever biased by a concealed spring to the position shown. One arm 46 of the lever serves as a latch to engage a fixed stop 48 to arrest the clockwise movement of the track frame at the dotted position indicated in FIG. 2.

When the grid 36 then gravitates to the right end of the track frame without frictional contact with the evaporator, the grid makes impact against the second arm 50 of the lever to retract the latch arm 46 and thus permit the track frame to drop sufficiently to bring the grid 36 to rest on the upper surface of the evaporator 14.

Suspended from the left end of the track frame 26 by suitable hook members 52 is a first upper counterbalance tank 54 which is of insufficient weight when empty to rock the track frame 26 counterclockwise but is of sufficient weight when it contains a body of water. In like manner, a second lower counterbalance tank 55 suspended from the right end of the track frame by cables 56 is of insufficient weight when empty to rock the track frame clockwise but is of sufficient weight when it contains a quantity of water.

The water for making the ice cubes is provided by a vertical supply tank 58 and, when necessary, the supply tank is replenished by water from a supply pipe 60 that is controlled by a manual regulating valve 62 and is further provided with a normally closed solenoid valve 64.

Connected to the supply tank 58 by a tube 65 is an associated vertical control tank 66 which contains a portion of the water supply. As shown in FIG. 4, a vertical control rod 68 with two floats 70 and 72 adjustable thereon at two different levels is suspended from a pressure sensitive switch 74. When the water level in the control tank 66 drops below the lower float 72, the consequent rise in the weight imposed on the switch causes the switch to close to energize the solenoid valve 64 for replenishing the water in the supply tank 58, and when the level in the control tank 66 reaches the upper float 70 the consequent reduction in the weight imposed on the switch causes the switch to open and thus close the solenoid valve 64 to terminate the replenishing flow.

An electrically actuated pump 75 connected to the bottom of the supply tank 58 by an intake pipe 76 serves the purpose of delivering water to an upwardly inclined pipe 78 that is connected to a two-way solenoid valve 80. Normally, i.e., when deenergized, the two-way solenoid valve 80 places the pipe 78 in communication with a pipe 82 that supplies water to a spray manifold 84 which is positioned above the freezing zone and is adapted to spray water onto the grid 36 for the purpose of forming ice cubes. When the spray manifold 84 is in operation, the sprayed water that does not freeze to form ice cubes drains off the lower end of the evaporator 14 into a trough 90 that returns the water to the supply tank 58 for recycling by the pump 75. When the two-way solenoid valve 80 is energized, it places the pipe 78 in communication with a pipe 85 which is provided with a manual regulating valve 86 and which terminates at a nozzle 88 for delivering water to the upper counterbalance tank 54.

The control switch 74 operatively associated with the control tank 66 not only controls the solenoid replenishing valve 64 but also controls the two-way solenoid valve 80 and, in addition, controls the solenoid valve 24 in the hot gas line 22. Thus when the water drops to a predetermined degree in the control tank 66, the solenoid valve 64 opens for replenishing flow of water, the two-way solenoid valve 80 is operated to deliver water to the upper counterbalance tank 54, and the solenoid valve 24 is opened for delivery of hot condensate and gases to the evaporator 14 to free the grid 36 from adhesion to the evaporator.

When the left end of the track frame 26 swings downward from the elevated position shown in FIG. 1 to the lower position shown in FIG. 2, a finger 92 extending from the left end of the track frame comes to rest against a fixed stop 94 and at the same time opens two normally closed switches 95 and 96 that are mounted at the fixed stop. The opening of the switch 95 stops the recirculation pump 75 and the opening of the switch 96 deenergizes the compressor in the condensing unit 16.

The upper counterbalance tank 54 is provided with a siphon loop 100 which is connected by a flexible tube 102 with a pipe 104 that is fitted with a terminal nozzle 105 for discharging water into the lower counterbalance tank 55. The lower counterbalance tank 55 is provided with a siphon loop 106 having a down leg 108 for draining the water to the sewer.

As shown in FIGS. 1 and 3, the grid 36 has transverse walls 110 and longitudinal walls 112 which form cells 114 that are open both at the top and at the bottom. It is to be noted that the walls and cells taper downward to favor release of the ice cubes. The grid has a peripheral outerwall 115 which extends above the level of the cells to confine the sprayed water.

Operation

Assuming that the freezing step in the overall cycle of operation is in process as indicated in FIG. 1, the water in the control tank 66 is between the levels of the two floats 70 and 72 with the float controlled switch 74 open. The refrigeration system is in operation with the plastic grid 36 resting on the surface of the evaporator 14. Water delivered to the spray manifold 84 sprays over the grid 36 as indicated by the arrows in FIG. 1 and the water that does not instantly freeze to form ice cubes drains into the trough 90 to return to the supply tank 58 for recycling by the pump 75. Sufficient water flows over the grid to cause water agitation which is necessary to make clear ice cubes.

As the freezing operation proceeds progressively an increasing proportion of the supply water is converted into ice cubes to cause the volume of supply water to diminish and when the supply water drops to a predetermined volume determined by the adjustment of the lower float 72, the control switch 74 associated with the control tank 66 closes to energize the solenoid valve 64 for replenishing flow of water. The control switch 74 simultaneously opens the solenoid valve 24 to raise the temperature of the evaporator 14 and operates the two-way valve 80 to divert the pumped water from the spray manifold 84 to the upper counterbalance tank 54.

The heating of the evaporator 14 releases the grid 36 from adherence to the evaporator and the delivery of water to the upper counterbalance tank 54 tilts the track frame 26 counterclockwise to the position shown in FIG. 2. The impact of the finger 92 on the left end of the track frame 26 against the two switches 95 and 96 at the fixed stop 94 stops the recirculation pump 75 and also stops the compressor of the condensing unit 16.

The change in the tilt of the track frame 26 to the position shown in FIG. 2 causes the grid 36 to gravitate from the freezing zone to the harvesting zone and the grid comes to rest against a pair of electrical contacts 110 on the left end of the track frame which serve the purpose of energizing the heating elements 42 in the plastic grid 36 for the purpose of releasing the formed ice cubes from the grid, the released ice cubes dropping into the bin 30.

In the meantime, the filling of the upper counterbalance tank 54 accomplished by the pump 75 before the pump is stopped, brings the water high enough in the upper counterbalance tank 54 to start flow through the siphon loop 100 to the lower counterbalance tank 55, the flow being regulated by adjustment of the valve 103 to afford ample time for release of all of the ice cubes from the grid 36. When sufficient water is delivered to the lower counterbalance tank 55 the right end of the track frame 26 is pulled down to a position determined by the abutment of the latch finger 46 against the fixed stop 48 and the empty grid 36 then gravitates to the right end of the track frame. The grid 36 makes impact against the trip arm 50 of the latch lever 44 to permit the right end of the track frame to drop to its normal position for placing the grid 36 against the evaporator 14.

The clockwise rotation of the track frame 26 from the position shown in FIG. 2 to the position shown in FIG. 1 releases the two switches 95 and 96 to resume operation of the recirculating pump 75 and to resume operation of the compressor in the condensing unit 16.

When the pump is stopped by the lowering of the left end of the track frame against the switch 95, the water level in the control tank 66 rises rapidly and soon the floats 70 and 72 cause the pressure-sensitive switch 74 to open. The opening of the switch 74 deenergizes the solenoid replenishing valve 64, deenergizes the two-way solenoid valve 80, and deenergizes the solenoid valve 24 in the hot gas line 22. All that is needed to start a new cycle is rise of the left end of the track frame to open the switches 95 and 96 to start the pump and start the compressor in the condensing unit. The siphoning of the water from the upper counterbalance tank 54 to the lower counterbalance tank 55 eventually tilts the track frame back to its normal position to start a new cycle and thereafter the water in the lower counterbalance tank is syphoned to the sewer.

All of the relationships involved in the operation of the apparatus are easily understood and it is apparent that anyone skilled in the art would find it a simple matter to make whatever adjustments are necessary for carrying out an operating cycle. It is further apparent that the duration of the overall cycle is determined by the operation of the control switch 74 associated with the control tank 66. Various factors may be altered to vary the time interval during which the control switch 74 is held open, the factors including the rate of delivery of water by the recirculating pump 75 to the upper counterbalance tank 54 as determined by the adjustment of the manual valve 86. The amount of water that is converted into ice cubes during a freezing step is controlled by the vertical spacing of the two floats 70 and 72 in the control tank 66. The manual valve 103 may be regulated to delay the flow of water from the upper counterbalance tank 54 to the lower counterbalance tank 55 to afford ample opportunity for the heating elements 42 to cause release of all of the ice cubes into the bin 30.

It may be readily appreciated that the apparatus is of relatively inexpensive construction but at the same time is of durable structure with high reliability. A striking advantage is that the operation is easy to understand and therefore the apparatus may be serviced, adjusted and repaired without requiring special skill and experience.

My description in specific detail of the selected embodiment of the invention will suggest various changes, substitutions and other departures from my disclosure within the spirit and scope of the appended claims.

I claim:

1. In a machine of the character described for producing ice cubes, the combination of:
   means providing a given initial quantity of supply water,
   pump means to withdraw water from the supply quantity;
   means connected to the output side of the pump means to spray the withdrawn water in a freezing zone to form ice cubes;
   means directing the unfrozen water from the freezing zone back to the supply water for recycling whereby the supply quantity is progressively reduced by the formation of the ice cubes;
   means to divert the pumped water from the freezing zone to a second zone in response to a predetermined reduction of the supply water;
   and means responsive to the diverted water to convey the formed ice cubes from the freezing zone to a harvesting zone.

2. In a machine of the character described for producing ice cubes, the combination of:
   means providing a supply quantity of water;
   pump means to withdraw water from the supply;
   means connected to the output side of the pump means to spray the water in a freezing zone to form ice cubes;
   means directing the unfrozen water from the freezing zone back to the supply water for recycling whereby the supply quantity is progressively reduced by the formation of the ice cubes;
   means responsive to a predetermined reduction of the supply quantity to initiate replenishment of the supply quantity and to divert the pumped water to a second zone;
   means responsive to the diverted water to harvest the ice cubes;
   and means responsive to replenishment of the supply quantity of water to terminate the replenishment and to terminate the diversion of the water.

3. In a machine of the character described for producing ice cubes, the combination of:
   a grid at a freezing zone;
   means providing a supply quantity of water;
   pump means to withdraw water from the supply quantity;
   means connected to the output side of the pump means to spray the water on the grid at the freezing zone for the formation of ice cubes on the grid;
   means directing the unfrozen water from the freezing zone back to the supply water for recycling whereby the supply quantity is progressively reduced by the formation of the ice cubes;
   means responsive to the reduction of the quantity of the supply water to thaw the freezing zone to release the grid from the freezing zone;
   means responsive to the reduction of the quantity of water to initiate replenishment of the supply and to convey the grid to a harvesting zone for release of the ice cubes from the grid and to return the grid to the freezing zone after a time delay;
   and means responsive to replenishment of the supply quantity of water to terminate the diversion of the pumped water and to terminate thawing of the freezing zone.

4. In a machine of the character described for producing ice cubes, the combination of:
   a grid for the formation of ice cubes;
   track means to support the grid, said track means being tiltable in one direction for gravitation of the grid from a freezing zone to a harvesting zone and being tiltable in the opposite direction for gravitation of the grid from the harvesting zone back to the freezing zone;
   means including counterbalance tank means operatively connected to the track means to tilt the track means in the two directions respectively;
   means to spray water on the grid in the freezing zone for the formation of ice cubes on the grid;
   and means to deliver water to the counterbalance tank means to tilt the track means to cause the grid to travel to the harvesting zone for harvesting of the ice cubes and subsequently to return the empty grid to the freezing zone.

5. In a machine of the character described for producing ice cubes, the combination of:
   a grid for the formation of ice cubes;
   track means to support the grid, said track means being tiltable in one direction for gravitation of the grid from a freezing zone to a harvesting zone and being tiltable in the opposite direction for gravitation of the grid from the harvesting zone back to the freezing zone;
   means including counterbalance tank means operatively connected to the track means to tilt the track means in the two directions respectively;
   means providing a supply quantity of water;
   pump means to withdraw water from the supply quantity;
   means connected to the output side of the pump means to spray the water on the grid in the freezing zone to form ice cubes;

means directing the unfrozen water from the freezing zone back to the supply water for recycling whereby the supply quantity is progressively reduced by the formation of the ice cubes;

means responsive to reduction of the supply water to a predetermined quantity to divert the pumped water from the freezing zone to the counterbalance tank means to tilt the track means in the two directions in succession to cause the grid to gravitate first to the harvesting zone and then to return back to the freezing zone;

means responsive to reduction in the quantity of the supply water to initiate replenishment of the supply water;

and means responsive to replenishment of the supply water to terminate the diversion of the water.

6. In a machine of the character described for producing ice cubes, the combination of:

a grid for the formation of ice cubes;

track means to support the grid, said track means being tiltable in one direction for gravitation of the grid from a freezing zone to a harvesting zone and being tiltable in the opposite direction for gravitation of the grid from the harvesting zone back to the freezing zone;

means including counterbalance tank means operatively connected to the track means to tilt the track means in the two directions respectively;

means providing a supply quantity of water;

pump means to withdraw water from the supply quantity;

means connected to the output side of the pump means to spray the water on the grid in the freezing zone to form ice cubes;

means directing the unfrozen water from the freezing zone back to the supply water for recycling whereby the supply quantity of water is progressively reduced by the formation of the ice cubes;

means responsive to reduction of the supply quantity of water to thaw the freezing zone to release the grid from the freezing zone;

means responsive to reduction of the supply quantity of water to a predetermined amount to divert the pumped water from the freezing zone to the counterbalance tank means to tilt the track means in the two directions in succession to cause the grid to gravitate from the freezing zone to the harvesting zone and then back to the freezing zone;

means responsive to the predetermined reduction in the quantity of the supply of water to initiate replenishment of the quantity of supply water;

means responsive to replenishment of the supply quantity of water to terminate the thawing of the freezing zone;

and means responsive to replenishment of the supply quantity of water to terminate the diversion of the water from the freezing zone.

7. A combination as set forth in claim 1 which includes means to accumulate at least a portion of the diverted water in the second zone;

and in which the means to convey the formed ice cubes from the freezing zone is responsive to rise in weight of the accumulated water.

8. A combination as set forth in claim 2 which includes means to store the diverted water temporarily to create potentional energy for release to move the ice cubes from the freezing zone to a harvest zone.

9. A combination as set forth in claim 5 which includes means to heat the grid for release of the ice cubes in response to gravitation of the grid to the harvesting zone.

10. A combination as set forth in claim 5 which includes means responsive to reduction of the supply of water to the predetermined quantity to apply heat to the freezing zone to release the grid for gravitation to the harvesting zone.

11. A combination as set forth in claim 5 which includes an evaporator in the freezing zone;

in which the grid normally rests on the evaporator;

which includes latch means to hold the lower end of the track slightly elevated when the track is tilted back to the freezing zone thereby to keep the evaporator from interfering with the gravity return of the grid, said latch being releasable in response to the return gravitation of the grid thereby to lower the grid to the evaporator.

12. A combination as set forth in claim 5 which includes means responsive to the track means to stop the pump means when the track means is tilted in said one direction.

13. A combination as set forth in claim 5 which includes a compressor for refrigerant and further includes means responsive to the track means to deenergize the compressor when the track means is tilted in said one direction.

References Cited by the Examiner

UNITED STATES PATENTS 2,691,275  10/54  Andrews _____ 62—135 X
2,763,993  9/56   Bayston _____ 62—138

ROBERT A. O'LEARY, *Primary Examiner.*